United States Patent [19]
Grindstaff et al.

[11] Patent Number: 5,901,886
[45] Date of Patent: May 11, 1999

[54] APPARATUS FOR STORING AND DISPENSING PARTICULATE MATERIAL AND VALVE FOR USE THEREIN

[76] Inventors: M. Boyd Grindstaff; Debbie S. Grindstaff, both of 718 S. Main, Grove, Okla. 74344

[21] Appl. No.: 08/994,766

[22] Filed: Dec. 19, 1997

[51] Int. Cl.⁶ .............................. B65D 47/00; B65D 3/00; B65D 5/38
[52] U.S. Cl. .................... 222/557; 222/555; 222/548; 222/485; 222/486; 222/156
[58] Field of Search ................... 222/485, 486, 222/548, 555, 156, 557

[56] References Cited

U.S. PATENT DOCUMENTS

| | | | |
|---|---|---|---|
| 164,801 | 6/1875 | Bryan | 222/548 |
| 1,618,118 | 2/1927 | Vartabedian | 222/485 |
| 1,778,424 | 3/1930 | Long | 222/485 |
| 2,349,724 | 5/1944 | Henderson | 222/485 |
| 2,782,967 | 2/1957 | Walker | 222/485 |
| 2,833,452 | 5/1958 | Drummond et al. | 222/555 |
| 3,952,925 | 4/1976 | Babunovic et al. | 222/485 |
| 4,491,246 | 1/1985 | Dooley | 222/129 |
| 4,613,063 | 9/1986 | Wright | 222/153 |
| 5,111,976 | 5/1992 | Ban | 222/485 |
| 5,340,030 | 8/1994 | Siegrist, Jr. | 239/289 |
| 5,529,219 | 6/1996 | Ward | 222/156 |

Primary Examiner—Joseph A. Kaufman
Assistant Examiner—Keats Quinalty
Attorney, Agent, or Firm—William R. Sharp

[57] ABSTRACT

An apparatus for storing and dispensing particulate material, such as bird seed, employs a dispensing valve having a first disk fixedly mounted in a housing and a second disk rotatably mounted in the housing. The first disk has circumferentially spaced first apertures and the second disk has circumferentially spaced second apertures. The boundaries of the first apertures intersect the periphery of the first disk, and the boundaries of the second apertures intersect the periphery of the second disk. The second disk can be rotated to select a desired position, such as a closed position in which the first and second apertures are completely unaligned, a fully open position in which the first and second apertures are completely aligned, or a partially open position in which the first and second apertures are partially aligned.

20 Claims, 2 Drawing Sheets

APPARATUS FOR STORING AND DISPENSING PARTICULATE MATERIAL AND VALVE FOR USE THEREIN

BACKGROUND OF THE INVENTION

This invention relates to the storing and dispensing of particulate material, such as seed for feeding birds.

Seed is typically bought in bulk quantities and stored in a suitably large container, preferably indoors (such as a garage) to prevent attack by raccoons, squirrels, or mice. When refilling bird feeders in the yard, seed is dipped or scooped from the container and transferred to a smaller container, such as a bucket or bowl, which is then carried to the feeders.

SUMMARY OF THE INVENTION

It is an object of the invention to provide an apparatus for storing and also dispensing seed or other particulate material by means of a valve which will conveniently dispense a desired amount of the seed at a desired flow rate without bridging or clogging.

According to one aspect of the invention, there is provided a valve comprising: a tubular housing having an interior surface and a longitudinal axis; a first disk fixedly and substantially coaxially mounted within the housing and having—a substantially circular first periphery, at least two (hereafter a number "n") circumferentially spaced first apertures with corresponding first boundaries which intersect the first periphery, and "n" peripheral first edges defining the first periphery and contacting or being immediately adjacent to the housing interior surface; a second disk rotatably and substantially coaxially mounted within the housing immediately adjacent to the first disk and having—a substantially circular second periphery, "n" circumferentially spaced second apertures with corresponding second boundaries which intersect the second periphery, and "n" peripheral second edges defining the second periphery and contacting or being immediately adjacent to the housing interior surface; and a control means for rotating the second disk to enable the second disk to be set at—a closed position in which the first and second apertures are completely unaligned, a fully open position in which the first and second apertures are completely aligned, or any intermediate and partially open position between the closed and fully open positions in which the first and second apertures are partially aligned. Preferably, "n"=2.

According to another aspect of the invention, there is provided an apparatus for storing and dispensing particulate material comprising: a bin, having an outlet end, for containing and storing the particulate material; and a valve as described above, wherein the housing has an inlet end integrally connected to the outlet end of the bin.

Various advantages of the above described aspects of the invention will be discussed in the Detailed Description of the Invention.

DETAILED DESCRIPTION OF THE INVENTION

A preferred embodiment of the invention will now be described in which bird seed is stored and dispensed. Of course, the invention can be used to store and dispense other particulate materials, such as fertilizer, feed, etc.

Figure 1:
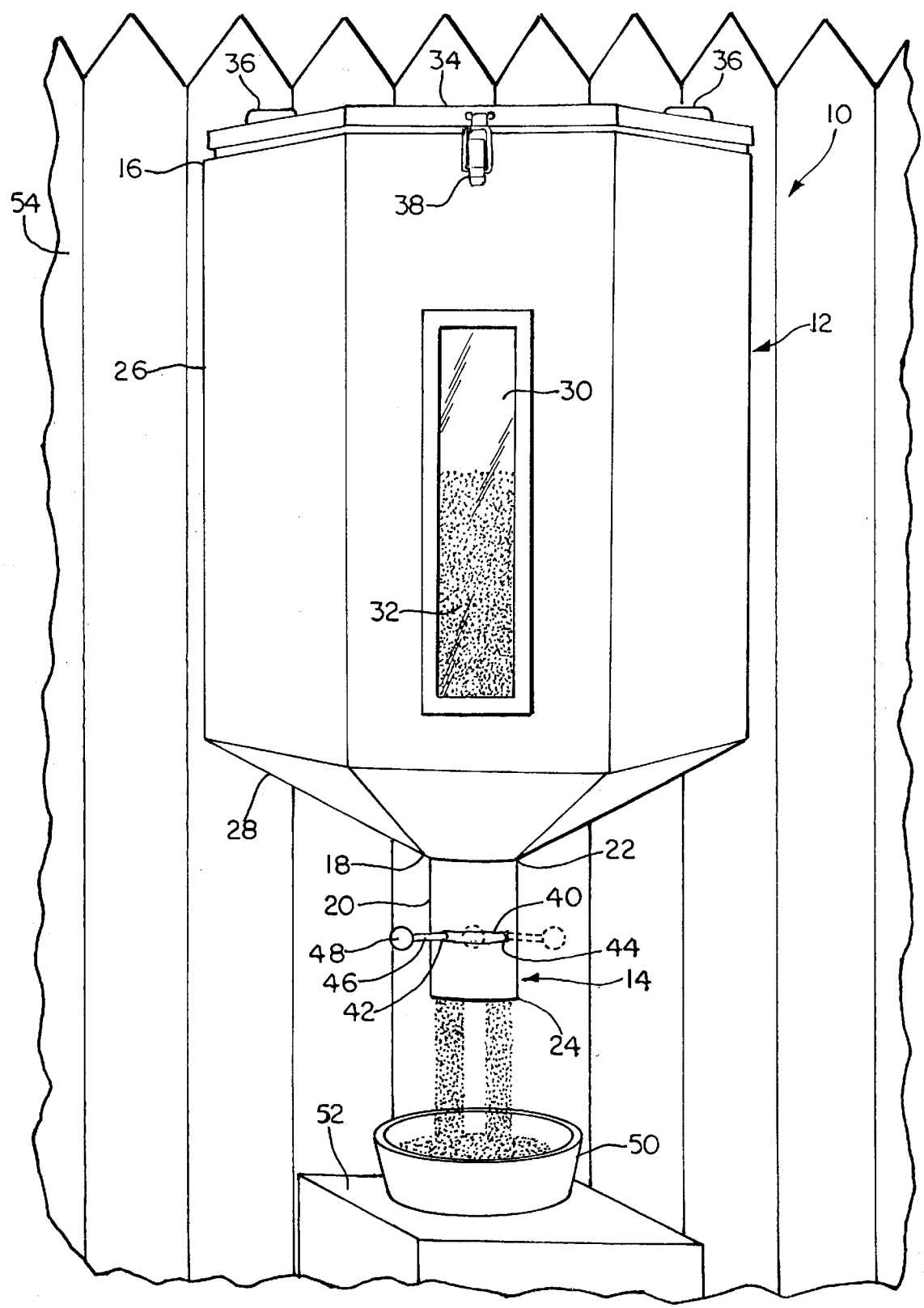
FIG. 1 is a view of an apparatus for storing and dispensing seed or other particulate material as mounted to a fence. The apparatus includes a valve for dispensing the seed or other particulate material.

Referring to FIG. 1, an apparatus 10 for storing and dispensing seed is shown. Apparatus 10 includes a bin 12 for storing the seed and a valve 14 for dispensing the seed. Bin 12 has an upper inlet end 16 and a lower outlet end 18, and valve 14 has a tubular housing 20 with an upper inlet end 22 and a lower outlet end 24. Outlet end 18 is integrally connected to inlet end 22. The term "integrally connected" as used herein and in the appended claims can mean any suitable fixed connection, but members integrally connected to one another could also be a single integral piece.

Bin 12 includes a main portion 26 and a tapered portion 28 such that main portion 26 extends from inlet end 16 to tapered portion 28, and tapered portion 28 downwardly tapers in size to outlet end 18. A viewing window 30 is mounted in main portion 26 to allow viewing the level of seed 32 in bin 12. A lid 34 is provided to cover inlet end 16. Lid 34 is connected to bin 12 at inlet end 16 to allow access to the interior of bin 12 for refilling the bin with seed. Hinged connections, as partially shown at 36, are preferred. An easily releasable snap lock 38 permits lid 34 to be locked down over inlet end 16.

As shown, valve housing 20 has a slot 40 transversely extending between opposing ends 42 and 44. A control lever 46 radially extends through and from slot 40 to a knob 48 affixed at its outer end. Lever 46 is movable in slot 40 so as to set valve 14 in a desired position. Lever 46 at slot end 42 sets valve 14 in its fully open position after having been moved from its closed position at slot end 44 (shown by broken lines). Seed is shown as being dispensed in two columnar streams into a bowl 50 as setting on a supporting surface 52. Of course, one could simply hold bowl 50 or other suitable container under valve 14 while seed is dispensed. To reduce the flow rate of seed, lever 46 can be moved to an intermediate, partially open position between slot ends 42 and 44 (as shown by broken lines). After the desired amount of seed has been dispensed, lever 46 is moved back to slot end 44 at the closed position to thereby stop the flow of seed from valve 14.

It should be apparent, therefore, that valve 14 is easily operated to dispense any amount of seed by just moving lever 46 to the desired position. This eliminates dipping and scooping seed from a container, which can require labor intensive bending and stooping.

Apparatus 10 is shown as being mounted to a fence 54, preferably in close proximity to feeders for optimum convenience. Mounting hardware is not shown. Apparatus 10 could also be mounted in an outdoor setting on the exterior wall of a house or shed, or indoors in, for example, a garage. Outdoor mounting is generally preferred because of the ability to position apparatus 10 near feeders. Even when mounted outdoors, apparatus 10 is mouse proof, squirrel proof, and even raccoon proof if mounted with outlet end 24 about 36 inches from ground level to prevent tampering with lever 46.

Figure 2:
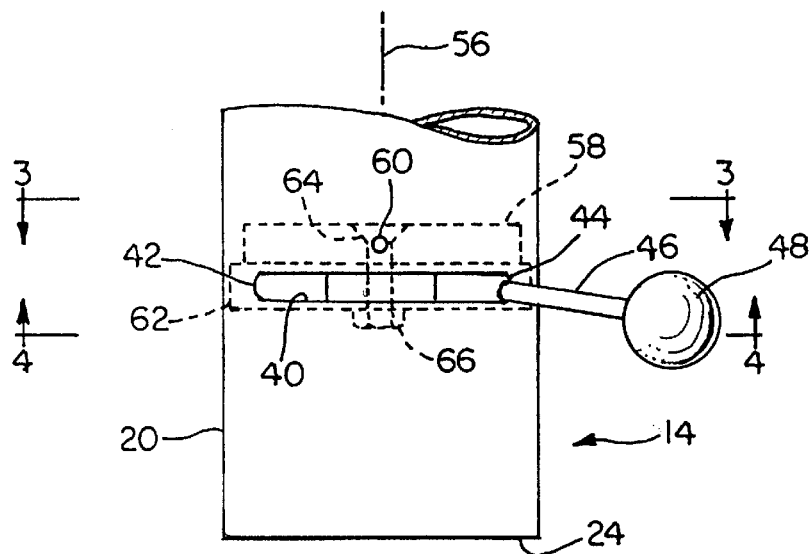
FIG. 2 is an enlarged side view of a portion of the valve.

Referring now to FIG. 2, valve housing 20 is shown as having a longitudinal axis 56. Various components of valve 14 within housing 20 are shown by broken lines. A disk 58 is fixedly and substantially coaxially mounted within housing 20. Disk 58 can be fixedly connected to housing 20 by any suitable means, such as rivets 60 (only one of which is visible in FIG. 2). A disk 62 is substantially coaxially mounted within housing 20 immediately adjacent to disk 58. Although disk 62 is snugly held against disk 58 by a bolt 64 and nut 66 (preferably fixed to bolt 64 by solder or other means), disk 62 is not connected to housing 20 and is freely rotatable within housing 20 relative to disk 58. Lever 46 is fixedly connected to disk 62 at its inner end, and radially extends from disk 62 through slot 40 (having opposing ends 42 and 44) so as to enable rotation of disk 62 to any desired position. Lever 46 and disk 62 are shown in the closed position, wherein an aperture and edges of disk 62 are visible through slot 40. Disk 62 is preferably positioned, as shown, between disk 58 and outlet end 24. Such relative positions of the disks assists in the ease of rotation of disk 62 without impedance by seed.

Figure 3:
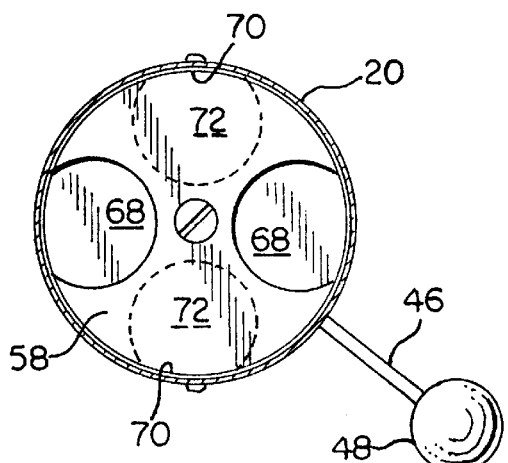
FIG. 3 is a cross-sectional view of the valve as viewed along line 3—3 in FIG. 2.

Referring now to FIG. 3, disk 58 has only two circumferentially spaced and radially opposed apertures 68 with corresponding boundaries which intersect the substantially circular periphery of disk 58. Disk 58 also has only two radially opposed edges 70 extending between apertures 68 and defining the periphery of disk 58. Edges 70 contact or are immediately adjacent to the interior surface of housing 20. Of course, if any part of edges 70 do not actually contact the interior surface of housing 20, the gap between such interior surface and such edges must be so small as to not allow any passage of seed therethrough. In the illustrated closed position, apertures 68 are completely unaligned with apertures 72 (the positions of which are shown by broken lines) of disk 62.

Figure 4:
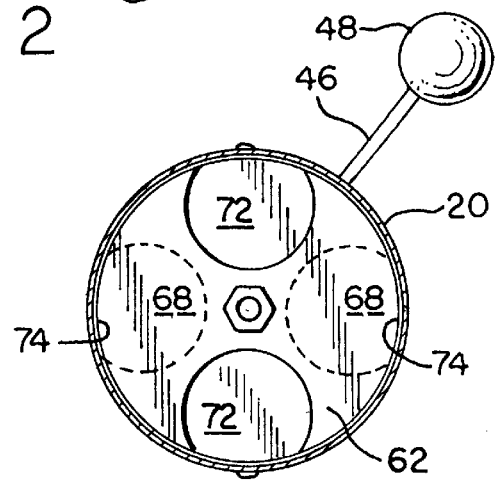
FIG. 4 is a cross-sectional view of the valve as viewed along line 4—4 in FIG. 2.

Referring now to FIG. 4, similarly to disk 58, disk 62 has only two circumferentially spaced and radially opposed apertures 72 with corresponding boundaries which intersect the substantially circular periphery of disk 62. Disk 62 also has only two radially opposed edges 74 extending between apertures 72 and defining the periphery of disk 62. Edges 74 contact or are immediately adjacent to the interior surface of housing 20. The positions of apertures 68 are shown by broken lines.

Figure 5:
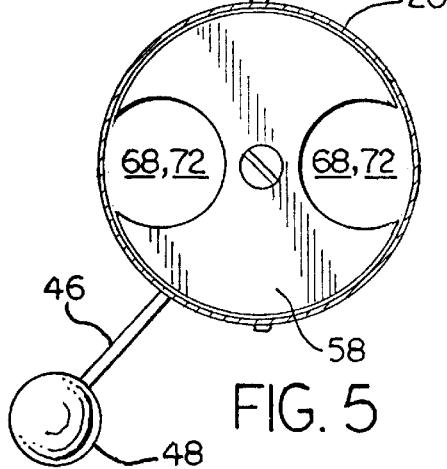
FIGS. 5 and 6 are cross-sectional views of the valve similar to the view of FIG. 3, but with the valve in different positions.

Referring now to FIG. 5, there is shown the fully open position in which apertures 68 and 72 are completely aligned.

Figure 6:
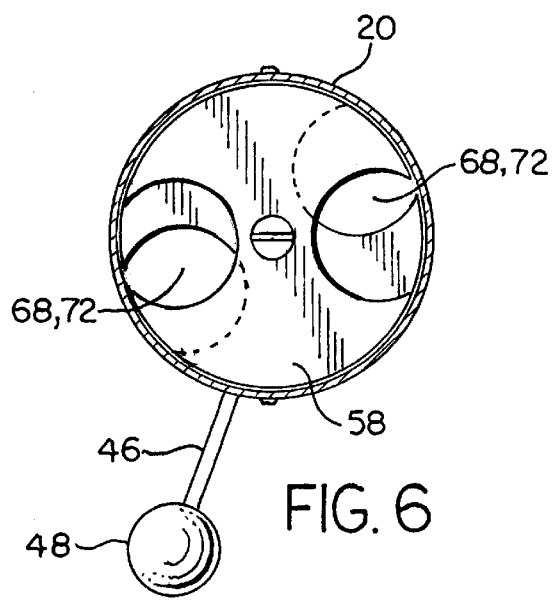

Referring now to FIG. 6, there is shown an intermediate and partially open position between the closed and fully open positions in which apertures 68 and 72 are partially aligned. Apertures 68 and 72 overlap in the indicated areas. Small portions of disk 62 are visible.

All of the above described apertures are preferably equivalent in size and shape. The boundary of each aperture in the illustrated embodiment is a circular arc, preferably subtending an angle at its center of about 200–280 degrees, most preferably about 220–260 degrees. With respect to the size of each aperture relative to the size of housing 20, the ratio of the housing inside diameter to the aperture diameter is preferably about 2:1–2.5:1.

Bridging and clogging are substantially avoided in valve 14. A bridging effect occurs when individual seeds wedge together or interlock as a result of stacking and/or opposed flows. Bridging can impede or even block flow. Since the boundaries of apertures 68 and 72 intersect the peripheries of their respective disks 58 and 62, a highly linear, smooth, and uninterrupted flow results because there is no obstruction to flow at or adjacent to the interior surface of housing 20. Such smooth and unobstructed flow is particularly true in the case of the fully open position and partially open positions where flow of seed is allowed along the interior surface of housing 20. Moreover, since each disk in the preferred embodiment has only two apertures that are radially opposed to one another, any seed not directly above the apertures will tend to flow in two streams away from each other but toward and smoothly through the apertures to further avoid bridging.

Adjustability of valve 14 is another advantageous feature which not only allows adjustment of flow rate, but makes valve 14 adaptable for use with seeds of many sizes. For example, when using very large seeds, such as striped sunflower seeds, it may be desirable to set valve 14 in its fully open position. When using smaller seeds such as thistle or safflower, a partially open position will probably be desirable.

With regard to materials of construction, bin 12 and valve housing 20 are preferably powder coated steel (i.e. 24 gauge), and disks 58 and 62 are preferably a rigid and sturdy plastic.

Obviously, many modifications and variations of the present invention are possible in light of the above teachings. For example, the apertures could have a shape other than circular, such as a triangular or oval shape. Or, according to broad aspects of the invention, each disk could have more than two apertures. However, this would not generally be desirable because the size of each aperture would necessarily be reduced, thereby limiting the adaptability to different sizes of seeds. It is, therefore, to be understood that within the scope of the appended claims, the invention may be practiced otherwise than as specifically described.

That which is claimed is:

1. A valve comprising:

a tubular housing having an interior surface and a longitudinal axis;

a first disk fixedly and substantially coaxially mounted within the housing and having—a substantially circular first periphery, at least two (hereafter a number "n") circumferentially spaced first apertures of which each has a single first boundary defining the first aperture and intersecting the first periphery, and "n" peripheral first edges defining the first periphery and contacting or being immediately adjacent to the housing interior surface;

a second disk rotatably and substantially coaxially mounted within the housing immediately adjacent to the first disk and having—a substantially circular second periphery, "n" circumferentially spaced second apertures of which each has a single second boundary defining the second aperture and intersecting the second periphery, and "n" peripheral second edges defining the second periphery and contacting or being immediately adjacent to the housing interior surface;

a control means for rotating the second disk to enable the second disk to be set at—a closed position in which the first and second apertures are completely unaligned, a fully open position in which the first and second apertures are completely aligned, or any intermediate and partially open position between the closed and fully open positions in which the first and second apertures are partially aligned.

2. A valve as recited in claim 1 wherein "n"=2, such that the first disk has only two radially opposed first apertures and only two radially opposed first edges extending between the first apertures, and such that the second disk has only two radially opposed second apertures and only two radially opposed second edges extending between the second apertures.

3. A valve as recited in claim 2 wherein the first and second apertures are substantially equivalent in size and shape.

4. A valve as recited in claim 3 wherein the first and second boundaries are circular arcs.

5. A valve as recited in claim 4 wherein each circular arc subtends an angle at its center of about 200–280 degrees.

6. A valve as recited in claim 5 wherein the angle is about 220–260 degrees.

7. A valve as recited in claim 6 wherein the housing has a housing inside diameter and each of the first and second apertures has an aperture diameter, and wherein the ratio of the housing inside diameter to the aperture diameter is about 2:1–2.5:1.

8. A valve as recited in claim 7 wherein the housing has a slot transversely extending between opposing ends, and wherein the control means comprises a lever fixedly connected to and radially extending from the second disk through the slot, the lever being movable to rotate the second disk to a desired position such that the lever at one end of the slot corresponds to the closed position, the lever at the other end of the slot corresponds to the fully open position, and the lever between the ends of the slot corresponds to an intermediate and partially open position.

9. An apparatus for storing and dispensing particulate material comprising:

a bin, having an outlet end, for containing and storing the particulate material; and a valve comprising (i) a tubular housing having an interior surface, a longitudinal axis, and an inlet end integrally connected to the outlet end of the bin, (ii) a first disk fixedly and substantially coaxially mounted within the housing and having—a substantially circular first periphery, at least two (hereafter a number "n") circumferentially spaced first apertures of which each has a single first boundary defining the first aperture and intersecting the first periphery, and "n" peripheral first edges defining the first periphery and contacting or being immediately adjacent to the housing interior surface, (iii) a second disk rotatably and substantially coaxially mounted within the housing immediately adjacent to the first disk and having—a substantially circular second periphery, "n" circumferentially spaced second apertures of which each has a single second boundary defining the second aperture and intersecting the second periphery, and "n" peripheral second edges defining the second periphery and contacting or being immediately adjacent to the housing interior surface, and (iv) a control means for rotating the second disk to enable the second disk to be set at—a closed position in which the first and second apertures are completely unaligned, a fully open position in which the first and second apertures are completely aligned, or any intermediate and partially open position between the closed and fully open positions in which the first and second apertures are partially aligned;

whereby, when the apparatus is oriented with the outlet end of the bin as its lower end and the inlet end of the valve housing as its upper end, a desired amount of particulate material can be dispensed by the valve by rotating the second disk from the closed position to a partially open or fully open position, followed by rotation of the second disk back to the closed position when the desired amount of particulate material has been dispensed.

10. An apparatus as recited in claim 9 wherein "n"=2, such that the first disk has only two radially opposed first apertures and only two radially opposed first edges extending between the first apertures, and such that the second disk has only two radially opposed second apertures and only two radially opposed second edges extending between the second apertures.

11. An apparatus as recited in claim 10 wherein the first and second apertures are substantially equivalent in size and shape.

12. An apparatus as recited in claim 11 wherein the first and second boundaries are circular arcs.

13. An apparatus as recited in claim 12 wherein each circular arc subtends an angle at its center of about 200–280 degrees.

14. An apparatus as recited in claim 13 wherein the angle is about 220–260 degrees.

15. An apparatus as recited in claim 14 wherein the housing has a housing inside diameter and each of the first and second apertures has an aperture diameter, and wherein the ratio of the housing inside diameter to the aperture diameter is about 2:1–2.5:1.

16. An apparatus as recited in claim 15 wherein the housing has a slot transversely extending between opposing ends, and wherein the control means comprises a lever fixedly connected to and radially extending from the second disk through the slot, the lever being movable to rotate the second disk to a desired position such that the lever at one end of the slot corresponds to the closed position, the lever at the other end of the slot corresponds to the fully open position, and the lever between the ends of the slot corresponds to and intermediate and partially open position.

17. An apparatus as recited in claim 16 wherein the housing has an outlet end opposite its inlet end and wherein the second disk is positioned between the first disk and the outlet end of the housing.

18. An apparatus as recited in claim 17 wherein the bin also has an interior and an inlet end opposite its outlet end, and wherein the apparatus further comprises a lid for covering the inlet end of the bin which is connected to the bin at such inlet end so as to allow access to the interior of the bin for refilling the bin with particulate material.

19. An apparatus as recited in claim 18 wherein the bin also has a viewing window which allows viewing of the level of particulate material in the bin.

20. An apparatus as recited in claim 19 wherein the bin includes a main portion and a tapered portion such that the main portion extends from the inlet end of the bin to the tapered portion and the tapered portion downwardly tapers in size to the outlet end of the bin, and wherein the viewing window is mounted in the main portion of the bin.

* * * * *